(12) United States Patent
Andrikowich et al.

(10) Patent No.: US 7,570,454 B1
(45) Date of Patent: Aug. 4, 2009

(54) FILL VALVE WITH A PRESS-FIT MEMBER FOR A SEALED HOUSING

(75) Inventors: Thomas G. Andrikowich, Whitinsville, MA (US); Michael C. Strzepa, Shrewsbury, MA (US)

(73) Assignee: Maxtor Corporation, Scotts Valley, CA (US)

( * ) Notice: Subject to any disclaimer, the term of this patent is extended or adjusted under 35 U.S.C. 154(b) by 275 days.

(21) Appl. No.: 10/839,548

(22) Filed: May 4, 2004

(51) Int. Cl.
G11B 33/14 (2006.01)
B65B 31/04 (2006.01)

(52) U.S. Cl. .................... 360/97.02; 141/66
(58) Field of Classification Search ............. 360/97.02; 141/14, 15, 65–66, 98, 265, 326, 327, 346–350; 137/234, 307, 315.25, 625.27, 625.5
See application file for complete search history.

(56) References Cited

U.S. PATENT DOCUMENTS

| | | | |
|---|---|---|---|
| 3,583,440 A * | 6/1971 | Andersson | 137/624.14 |
| 5,282,100 A | 1/1994 | Tacklind et al. | 360/97.02 |
| 5,454,157 A | 10/1995 | Ananth et al. | 29/603 |
| 5,666,243 A | 9/1997 | Brent | 360/106 |
| 5,784,296 A | 7/1998 | Baker et al. | 364/551.01 |
| 5,944,068 A * | 8/1999 | Hool | 141/65 |
| 6,144,178 A | 11/2000 | Hirono et al. | |
| 6,178,059 B1 | 1/2001 | Frees | 360/75 |
| 6,222,375 B1 | 4/2001 | Fitzpatrick et al. | 324/601 |
| 6,317,286 B1 | 11/2001 | Murphy et al. | |
| 6,392,838 B1 | 5/2002 | Hearn et al. | 360/97.02 |
| 6,496,362 B2 | 12/2002 | Osterhout et al. | |
| 6,567,235 B2 | 5/2003 | Kasetty et al. | 360/97.01 |
| 6,618,221 B2 | 9/2003 | Gillis et al. | |
| 6,631,053 B1 | 10/2003 | Chew | 360/265.7 |
| 6,644,362 B2 | 11/2003 | Bernett | |
| 6,646,821 B2 | 11/2003 | Bernett | |
| 6,678,102 B1 | 1/2004 | Liikanen et al. | 360/31 |
| 6,683,747 B2 | 1/2004 | Bernett | |
| 6,762,909 B2 | 7/2004 | Albrecht et al. | |
| 6,785,082 B2 | 8/2004 | Fiorvanti et al. | |
| 6,785,089 B2 | 8/2004 | Bernett | |

(Continued)

FOREIGN PATENT DOCUMENTS

WO  WO 2004/010419 A1  1/2004

(Continued)

OTHER PUBLICATIONS

U.S. Appl. No. 10/055,237, filed Oct. 24, 2001, Marshall et al.

(Continued)

Primary Examiner—A. J. Heinz
(74) Attorney, Agent, or Firm—Fellers, Snider, et al.

(57) ABSTRACT

A method and apparatus for sealing a hard disk drive with a low-density gas is provided. A valve body is positioned over an opening in the hard disk drive housing. The valve body is in communication with a source of low-density gas, a vacuum source and the interior of the disk drive. The vacuum source evacuates the internal cavity of the disk drive through the opening. The cavity is then filled with the low-density gas. A reciprocating member then positions a sealing member in the opening to seal the opening and capture the low-density gas within the disk drive.

37 Claims, 4 Drawing Sheets

U.S. PATENT DOCUMENTS

| | | |
|---|---|---|
| 6,831,811 B1 * | 12/2004 | Andrikowich et al. ..... 360/97.02 |
| 6,876,515 B2 | 4/2005 | Unno |
| 6,898,043 B2 | 5/2005 | Fioravanti |
| 6,914,742 B1 | 7/2005 | Fioravanti et al. |
| 6,930,858 B2 | 8/2005 | Gunderson et al. |
| 6,970,322 B2 | 11/2005 | Bernett |
| 6,989,493 B2 | 1/2006 | Hipwell, Jr. et al. |
| 6,999,262 B2 | 2/2006 | Han et al. |
| 7,046,469 B2 * | 5/2006 | Tanaka ......................... 360/69 |
| 2003/0007280 A1 | 1/2003 | Bernett et al. ............ 360/77.02 |
| 2003/0026033 A1 | 2/2003 | Fioravanti et al. ............. 360/75 |
| 2003/0081349 A1 | 5/2003 | Bernett ................... 360/97.02 |
| 2003/0089417 A1 | 5/2003 | Bernett ....................... 141/65 |
| 2003/0090832 A1 | 5/2003 | Bernett et al. ........... 360/97.02 |
| 2003/0172520 A1 | 9/2003 | Liu et al. |
| 2003/0179489 A1 | 9/2003 | Bernett et al. ............ 360/97.01 |
| 2003/0202276 A1 | 10/2003 | Smith ..................... 360/97.02 |
| 2004/0216514 A1 | 11/2004 | Nunnally |
| 2005/0068666 A1 | 3/2005 | Albrecht et al. |
| 2005/0173870 A1 | 8/2005 | Gunderson |
| 2005/0184463 A1 | 8/2005 | Boutaghou et al. |
| 2006/0002067 A1 | 1/2006 | Gunderson et al. |
| 2006/0044666 A1 | 3/2006 | Fukushima |
| 2006/0044675 A1 | 3/2006 | Fukushima et al. |
| 2006/0072241 A1 | 4/2006 | Feliss et al. |
| 2006/0072244 A1 | 4/2006 | Rapp |

FOREIGN PATENT DOCUMENTS

| | | | |
|---|---|---|---|
| WO | WO 2004/010431 A1 | 1/2004 | |

OTHER PUBLICATIONS

U.S. Appl. No. 10/055,237, filed Oct. 24, 2001.
U.S. Appl. No. 10/266,436, filed Oct. 8, 2002.
U.S. Appl. No. 10/839,608, filed May 4, 2004.
U.S. Appl. No. 10/848,476, filed May 17, 2004.
U.S. Appl. No. 10/839,611, filed May 4, 2004.
U.S. Appl. No. 10/839,606, filed May 4, 2004.
U.S. Appl. No. 10/839,685, filed May 4, 2004.
U.S. Appl. No. 10/860,626, filed Jun. 2, 2004.
U.S. Appl. No. 10/839,608, filed May 4, 2004, deJesus et al.
U.S. Appl. No. 10/848,476, filed May 17, 2004, Burns et al.
U.S. Appl. No. 10/839,611, filed May 4, 2004, Gifford et al.
U.S. Appl. No. 10/839,606, filed May 4, 2004, Andrikowich et al.
U.S. Appl. No. 10/839,685, filed May 4, 2004, Andrikowich et al.
U.S. Appl. No. 10/860,626, filed Jun. 2, 2004, Mann et al.
IBM Corp., "Seal for a Hermetically Sealed Disk File," IBM Technical Disclosure Bulletin, vol. 27, No. 11 (Apr. 1985).

* cited by examiner

FILL VALVE WITH A PRESS-FIT MEMBER FOR A SEALED HOUSING

FIELD OF THE INVENTION

The present invention relates to hard disk drives, and more particularly to a system for sealing a hard disk drive with low density gas to create and maintain a low density gas environment for operation of the storage medium.

BACKGROUND OF THE INVENTION

Hard disk drives incorporate magnetic storage disks and read/write heads which are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly which positions the heads relative to the surface of the storage disks. This may be at a predetermined height above the corresponding storage disk or, in some instances, in contact with the surface of the storage disk. The actuator assembly is typically positioned by a voice coil motor which acts to position the slider over a desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to a plurality of hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly narrower. However, decreasing the width of tracks makes it more difficult for the read/write heads to accurately read and write information to and from the narrowing tracks. Not only is it difficult to physically position the read/write element over a narrow width track, but it is increasingly difficult to maintain the read/write element over the track at an optimal position for accurate data transfer. Air turbulence created by the spinning disks, disk flutter and spindle vibrations, temperature and altitude can all adversely effect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations further increasing TMR. Higher rotational speeds can also increase spindle motor power and idle acoustics.

Accuracy can be further adversely effected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. Because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors, as well as air turbulence, disk flutter and spindle vibration, can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals used in disk drives between the housing components, such as the base plate and cover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

As an alternative to air-filled drives, advantages may be achieved by filling disk drives with gases having a lower density than air. For example, helium has a lower density than air at similar pressures and temperatures and can enhance drive performance. As used herein, a low density gas or a lower density gas means a gas having a density less than that of air. When compared with air, lower density gases can reduce aerodynamic drag experienced by spinning disks within the drive, thereby reducing power requirements for the spindle motor. A low density gas-filled drive thus uses less power than a comparable disk drive that operates in an air environment. Relatedly, the reduction in drag forces within the low density gas-filled drive reduces the amount of aerodynamic turbulence that is experienced by drive components such as the actuator arms, suspensions and read/write heads. Some low density gases also have greater thermal conductivity, which results in better motor efficiencies and, therefore, lower power consumption for a given performance level. Reduction in turbulence allows drives filled with low density gas to operate at higher speeds compared with air-filled drives, while maintaining the same flying height and thereby maintaining the same range of read/write errors. Low density gas-filled drives also allow for higher storage capacities through higher recording densities due to the fact that there is less turbulence within the drive which allows the tracks to be spaced more closely together.

Despite these advantages, low density gas-filled drives have not been commercially successful. Low density gas-filled drives, in order to function, must be effectively sealed over an acceptable lifetime of the drive. It has been difficult to prevent the low density gas from escaping from the sealed drive environment. Unlike air-filled drives, a port may not be used to equalize pressure outside and inside the drive. As a result, the seal between the cover and base plate must minimize or prevent leakage and maintain a threshold level of low density gas within the sealed environment over the expected lifetime of the drive. Conventional rubber seals used in air-filled drives are inadequate at preventing leakage of low density gas due to the smaller atom size of low density gases, such as helium, compared to air. The smaller helium atoms diffuse through the rubber seals, thereby reducing the volume of low density gas within the drive. Thus, over time, the necessary threshold quantity of low density gas may be lost within the drive environment and may or may not be replaced with ambient air. In either case, the performance of the drive will change from the design specifications, namely, a low density gas-filled sealed environment. As the low density gas leaks out of a drive and is replaced by air, the drive is subject to undesirable operational effects possibly leading to unacceptable error rates and/or failure of the drive. For example, the increased concentration of air may increase the turbulent forces on the heads due to the increased drag forces within the drive which may further cause the heads to fly at too great a distance above the disks and potentially increasing instances of read/write errors. If the low density gas leaks from the sealed environment over time and is not replaced by ambient air, problems will occur such as the heads flying at a distance too close or in contact with the disks, thereby increasing instances of read/write errors as well as damage to the disk surface and head and higher operating temperatures due to a reduction in conduction cooling. Each creates a reliability risk. The risk of unanticipated failures due to inadequate amounts of low density gas within the drive is a draw back to low density gas-filled drives. Indeed, data stored within the drive may be irretrievably lost if the drive fails due to the loss of the low density gas environment.

One example of a multi-component valve assembly for use in evacuating air from a disk drive, filling the drive with a low density gas and sealing the port against loss of the low density gas is found in co-pending application Ser. No. 10/266,436, entitled "Disk Drive with Evacuation/Fill Valve Assembly," filed on Oct. 8, 2002 and assigned to the same assignee as the present application. As disclosed therein, a ball valve is disclosed wherein a ball or sealing member is biased against an opening or port in the disk drive housing by a spring (see, FIGS. 4 and 5 therein). This disclosure also teaches that the ball may be made from a softer metal than the housing or at least have an exterior portion that is softer than the housing in order to substantially conform to the port or opening in the housing to attain a better seal.

SUMMARY OF THE INVENTION

The preferred embodiment of the present invention relates to a system for filling and sealing a hard disk drive to contain a low density gas, such as helium. In the preferred embodiment, the present invention provides a single component sealing system. An opening or aperture is provided in the drive housing, either in the base plate or cover, through which ambient air is evacuated from the interior and through which the low density gas is inserted. A valve housing or body is sealed against the outer surface of the drive creating a closed environment. The housing has at least two openings. The first opening is aligned with the opening in the disk drive housing. In the preferred embodiment, the second opening in the valve body is connected to a vacuum device for evacuating air from the interior of the drive and to a source of low density gas for filling the drive with the low density gas. Alternatively, the valve housing may have separate openings interconnecting the vacuum source and low density gas source to the valve housing.

In the preferred embodiment, the fixture includes a reciprocating member or ram-like device which moves between a first position and a second position. In one position, the reciprocating member is spaced from both openings in the valve body and an unobstructed pathway exists between the opening in the drive housing and the opening or openings in the valve housing which is/are in communication with a vacuum source and a low density gas source. In this position, air within the disk drive housing is evacuated using the vacuum source. Once evacuated, the disk drive is filled with a low density gas from the gas source.

In the other position, the reciprocating member forces a seal into the aperture in the drive housing to seal the opening. The seal is achieved by an interference fit between the walls of the aperture and the seal. A seal is created which is substantially hermetic in that it at least maintains a low-density gas environment within the disk drive housing by maintaining leakage levels to an acceptable volume based upon a predetermined life for the disk drive. Upon creating the seal, the valve fixture is removed or detached from the housing and the disk drive is ready for testing and/or operation.

If the drive is subjected to rework operations, the cover and base plate will necessarily be separated and the sealed internal environment will be lost. Upon resealing the drive, the same process may be used. The originally installed sealing plug may be removed from the disk drive housing by forcing it out of the aperture in the drive housing. Alternatively, the sealing plug may be left in place and a new opening created in the disk drive housing. The new opening would be sealed in the same manner.

The aperture in the drive housing may be cylindrical in shape, it may be tapered such that the diameter of the aperture is greater at the exterior of the disk drive housing and a smaller diameter at the interior of the housing, or it may have a counter bore. Alternative shapes will be known to those of skill in the art. In the preferred embodiment, a counter bore is utilized and the distal end of the ram or reciprocating member is configured to substantially match the shape of the aperture near the exterior of the drive. In the preferred embodiment, the counter bore aligns the reciprocating member with the aperture to optimally locate the seal in the housing aperture. The seal is preferably made of the same material as the housing to accommodate thermal expansion without comprising the seal. The seal will typically be an aluminum sphere of slightly greater diameter than the diameter of the aperture. Alternatively, the seal may be a sphere of some metal or plastic composition designed to closely match the thermal expansion properties of the sealing aperture.

DETAILED DESCRIPTION

Figure 1:
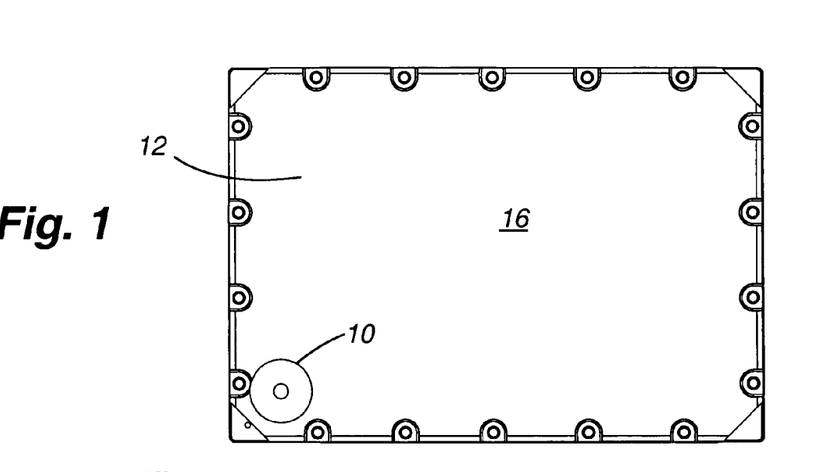
FIG. 1 is a top plan view of a disk drive housing and fill valve of the present invention.
Figure 2:
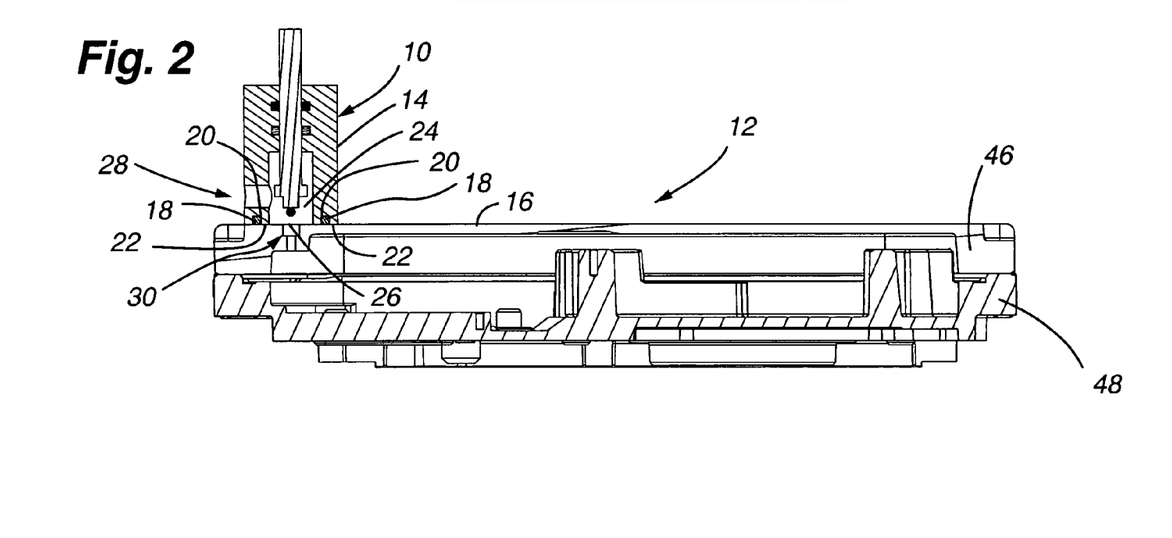
FIG. 2 is a cross-section view of the disk drive housing and fill valve taking along line 2-2 of FIG. 1.

Turning to FIGS. 1 and 2, a preferred embodiment of the valve body or housing 10 for creating a hermetic seal in the housing of a disk drive 12 is shown. The valve housing comprises a main body 14 which is sealed against an outer surface 16 of the disk drive. As shown in FIG. 2, an O-ring seal 18 is disposed in a groove 20 formed in one surface 22 of the valve housing in contact with the disk drive housing surface 16 to maintain the seal. In order to maintain the seal, the valve is held against the surface of the disk drive by a force sufficient to compress the gasket and create a seal.

In the preferred embodiment, the valve body has a cavity or inner chamber 24 with two openings 26, 28. The first opening 26 is aligned with an aperture or opening 30 in the housing of the disk drive. The second opening 28 is in communication with an external source of low density gas, such as helium, and a vacuum source (not shown).

Figure 3:
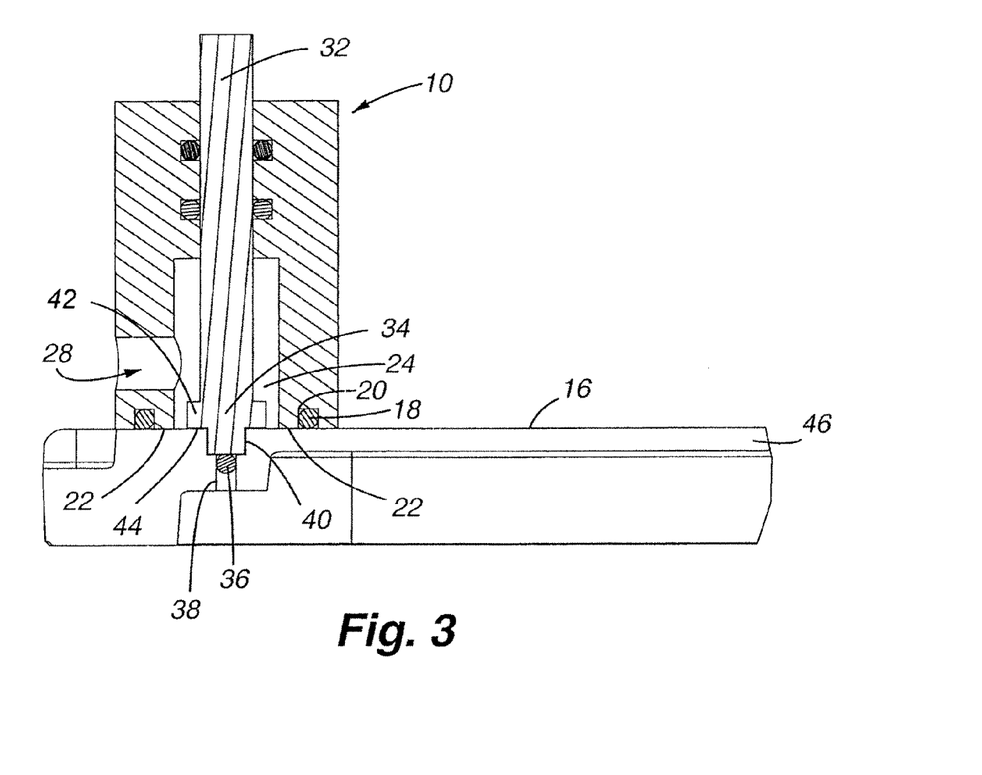
FIG. 3 is a partial cross-section view of one embodiment of the fill valve of the present invention and a disk drive housing.
Figure 4:
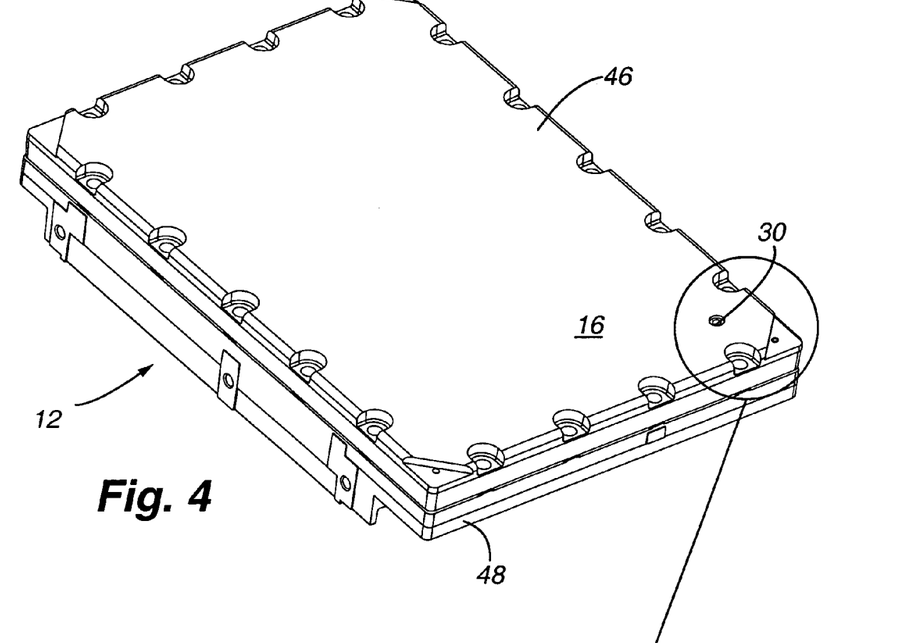
FIG. 4 is an isometric view of a disk drive housing further showing an opening for evacuating air from within the housing and filling the housing with low density gas.
Figure 5:
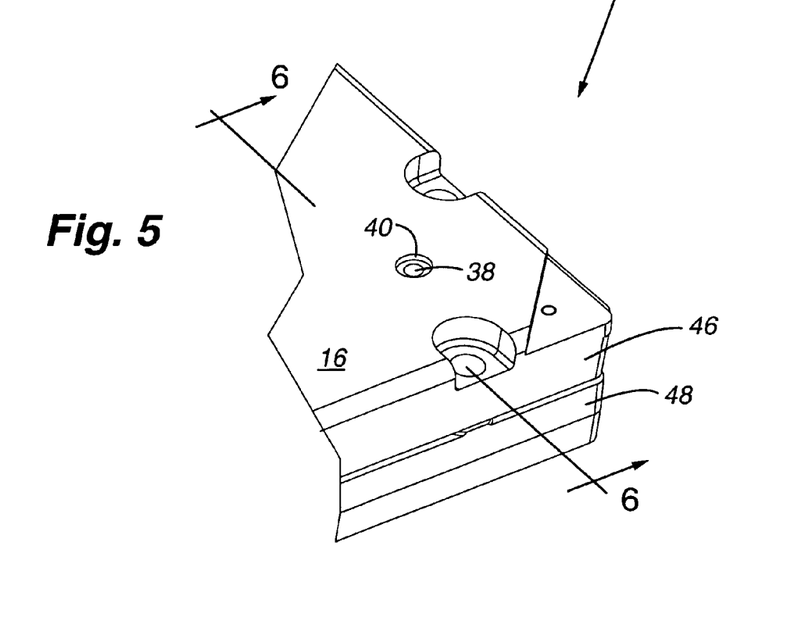
FIG. 5 is an enlarged partial isometric view of the disk drive housing shown in FIG. 4.
Figure 6:
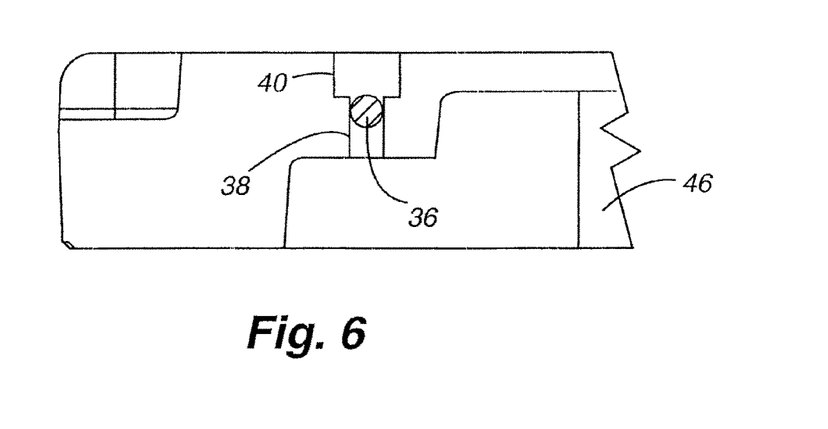
FIG. 6 is an enlarged partial cross-section of a disk drive housing, taken along line 6-6 of FIG. 5.

A reciprocating member or ram 32 is also disposed in the valve body and moves between a first position (shown in FIG. 2) and a second position (shown in FIG. 3). In the second position, the distal end of the reciprocating member 34 is spaced from the first and second openings 26, 28 to allow fluid communication between the first and second openings. In this manner, the vacuum source may act to evacuate air from inside the disk drive through aperture 30 and the low density gas source may act to fill the disk drive housing with a low density gas. In the first position, the reciprocating member forces a sealing plug 36 into the aperture 30 in the housing of the disk drive to create a seal. Ideally, the seal will be completely hermetic, i.e., no gas will escape through the seal. However, for purposes of the present application, the seal is sufficiently hermetic if it maintains an appropriate quantity of low-density gas within the interior chamber of the disk drive for a predetermined period of time, e.g., an acceptable life time for a disk drive.

The aperture 30 in the housing and the distal end 34 of the reciprocating member may undertake a variety of shapes. In the embodiment shown in FIGS. 2 and 3, the opening in the disk drive housing comprises two cylindrical portions of different diameters. In the preferred embodiment, the lower cylindrical opening or sealing cavity 38 has a diameter of 0.0602 inches±0.0004 inches. The upper cylindrical opening or counter bore 40 has a diameter of 0.118±0.001 inches. In the preferred embodiment, the seal or plug 36 may take the shape of a sphere. Preferably, the sphere would be of the same material as the disk drive housing to match the thermal expansion characteristics of the housing once installed. In this case, the housing and plug are aluminum. In the preferred embodiment, the ball would have a diameter of 0.0625 inches±0.0005 inches which is slightly larger than the opening of the sealing cavity 38. Upon activation of the reciprocating member, the sealing plug will be driven into the sealing cavity to seal the opening. The sealing cavity has sufficient force to overcome resistance by the walls of the aperture and force the ball or sphere into the sealing cavity to create a seal. The walls of the aperture are sufficiently rigid or robust to cause the reciprocating member to deform rather than the walls deforming. In the preferred embodiment, the operative or distal end of the ram 34 would have a shape complementary to the counter bore 40 of the opening in the disk drive housing. For example, as shown in FIG. 3, the diameter and shape of the distal end 34 matches that of the counter bore 40. This complementary shape facilitates placement of the seal 36 in the sealing cavity 38. The reciprocating member may also have a portion 42 that extends laterally with abutment surfaces 44 that interact with the outer surface 16 of the disk drive and act as a stop to ensure accurate and optimum placement of the sealing plug 36 in the sealing cavity 38.

In operation, the valve housing is attached to the surface of the disk drive, such that the opening 28 and reciprocating member 32 are aligned with the aperture 30 in the disk drive housing. Although the aperture 30 is shown in cover 46, it could alternatively be located in the base plate 48 or at another location on the cover or base plate. The opening 28 is connected to a vacuum source and to a source of low density gas (not shown). As a first step, and with the reciprocating member in a withdrawn position such that openings 26 and 28 are in fluid communication, the vacuum source evacuates air from inside the disk drive. Subsequently, a source of low density gas, such as helium, fills the drive with low density gas through the same opening 32. When the drive is filled with the appropriate quantity of gas, the reciprocating member is activated to move the sealing plug 36 into the sealing cavity 38 and create at least a substantially hermetic seal. The sealing plug may be aligned with sealing cavity 38 and held in place relative to the reciprocating member 32 by mechanical means or with a vacuum.

Figure 7:
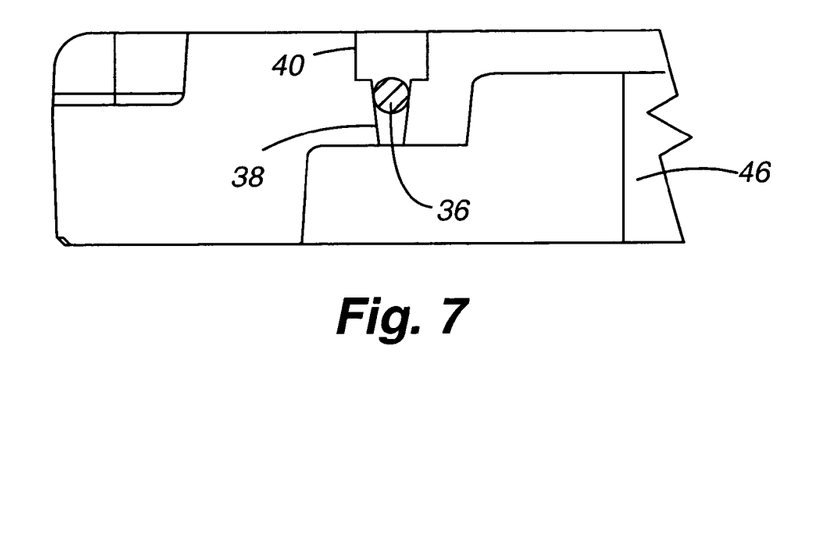
FIG. 7 is an enlarged partial cross-section of an alternative embodiment of the disk drive housing shown in FIG. 6.

In an alternative embodiment, shown in FIG. 7, the sealing cavity 38 may be tapered and the distal end of the ram 34 also tapered in a complementary fashion. The seal or ball 36 may similarly create a substantially hermetic seal when it is deformed within the tapered cavity. In either embodiment, the seal 36 is the only component forming the seal. There is no additional component that assists in holding the seal in place or that provides further sealing capabilities. Also, in the preferred embodiment, the sealing plug is aluminum, with no other material in its composition, since additional materials pose risks to the operation of the disk drive.

In situations where rework of the drive may be necessary, at least two options are available. First, upon detaching the cover 46 from the base plate 48, the previously installed plug 36 may be removed by pushing it out of the cavity from the inside of the disk drive towards the outside. Then, once the drive is ready for resealing, the process may be repeated and a new seal placed in the existing sealing cavity. Alternatively, the original seal may be left in place and a new aperture or port 30 formed in the housing of the disk drive. In this circumstance, a new plug will be sealed within the newly created aperture in the same fashion as previously described. If a new hole is created, care must be taken to assure that the exposed walls of the new sealing cavity are properly sealed. It is possible that voids formed during the casting process may be exposed by the creation of the new aperture 30. Such voids could create an uneven surface and adversely affect the ability of the plug to seal the opening. In the preferred embodiment, the aluminum components such as the base plate and cover would be subjected to a sealing process which would fill any voids in the surface of these components prior to placement of the sealing plug 36 in the opening 30. This process is described in co-pending Application Ser. No. 10/839,608 entitled "Custom Process to Seal Aluminum Die Castings to Contain Helium", which is incorporated herein by reference. If a new aperture is created, the component could be resealed according to the processes described in this co-pending application to fill any voids in the newly exposed surface.

Figure 8:
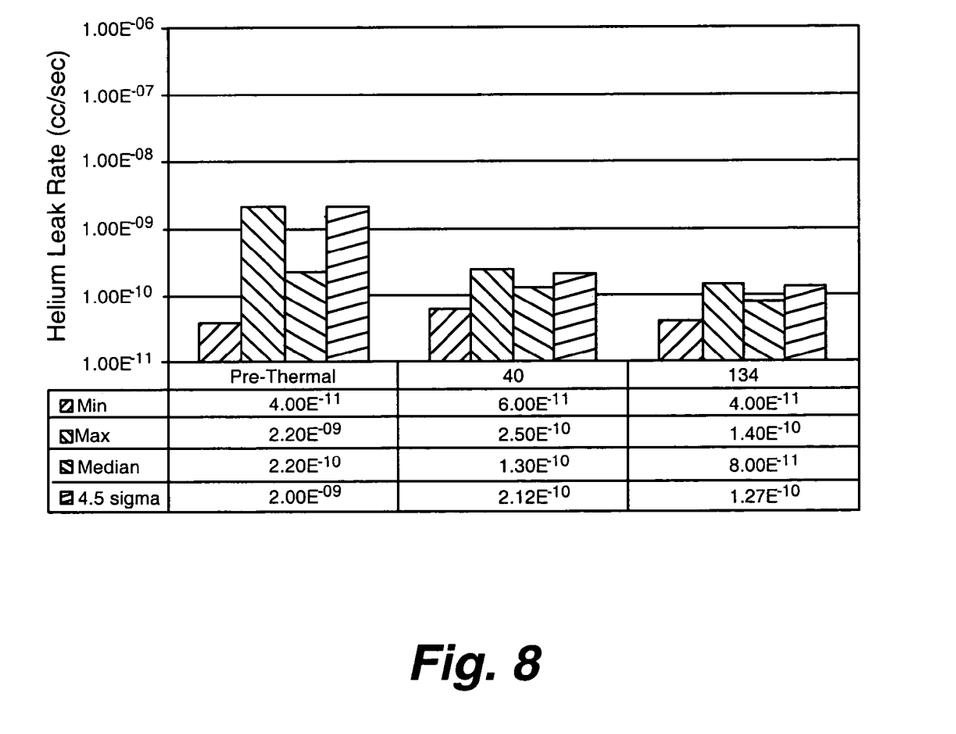
FIG. 8 is a table of test data taken using a disk drive sealed according to the present invention.

The Table in FIG. 8 shows the results of empirical testing performed on 20 test devices having an opening sealed according to the present invention. The purpose of the test was to determine helium leak rates through a sealed opening in a cast aluminum test device. The test devices were tested for leakage prior to any thermal cycling and then after 40 thermal cycles between $-40°$ C. and $100°$ C., and after 134 cycles, between $-40°$ C. and $100°$ C. The Table shows the minimum leakage, maximum leakage, median and $4.5\tau$ for 20 test devices at these three points. As can be seen, the maximum leakage occurred prior to any thermal cycling, and was between $1.0\ E^{-8}$ and $1.0\ E^{-9}$ cubic centimeters per second. For a disk drive to maintain a helium environment at a satisfactory level to operate for a period of five years, Applicants have determined that the leakage rate cannot exceed $4.3\ E^{-8}$ cubic centimeters per second. $4.3\ E^{-8}$ cubic centimeters per second is the equivalent of losing five percent (5%) of the helium contained in a drive over a five-year period. The results from the testing shown in FIG. 8 are below that level and thus it is believed that the seal of the present invention will maintain the volume of low density gas within the disk drive and not be a source of failure of the disk drive. Thus, the seal will be substantially hermetic in that it should permit successful operation of the drive for an acceptable predetermined lifetime.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A valve for hermetically sealing an aperture in a housing of a hard disk drive to contain low density gas within the housing, comprising:

a valve body comprising a first surface which engages the housing and a sealing member associated with the first surface to create a seal between the valve body and the housing;

a chamber formed in the valve body and having a first opening at the first surface of the valve body and a second opening at a different surface of the valve body; and a reciprocating member movable between a first position and a second position to force a sealing plug into the aperture with at least a selected one of the sealing plug or the aperture being deformed to seal the aperture so that there is no additional component that assists in holding the sealing plug in place, where the first opening is in fluid communication with the second opening when the reciprocating member is in the first position and where the reciprocating member extends at least into the first opening when the reciprocating member is in the second position.

2. The valve of claim 1, wherein the reciprocating member is disposed within the chamber.

3. The valve of claim 1, wherein the reciprocating member further comprises a distal end shaped to extend into the aperture in the housing.

4. The valve of claim 3, wherein the distal end of the reciprocating member is shaped substantially the same as an entry portion of the aperture.

5. The valve of claim 1, wherein the second opening is adapted to communicate with a vacuum source to evacuate air from the housing and a low density gas source to fill the housing with a low density gas.

6. The valve of claim 1, wherein the sealing member is an O-ring.

7. The valve of claim 1, further comprising a third opening in the valve body located at a surface other than the first surface.

8. The valve of claim 7, wherein the second opening is in fluid communication with one of a vacuum source or a low density gas source, and the third opening is in fluid communication with the other source.

9. The valve of claim 1, further comprising a second sealing member, said second sealing member being positioned at the distal end of the reciprocating member.

10. The valve of claim 9, wherein the second sealing member is positioned outside of the valve body when the reciprocating member is in the second position.

11. The valve of claim 9, wherein the second sealing member is positioned in the aperture of the housing when the reciprocating member is in the second position.

12. The valve of claim 1, wherein the reciprocating member further comprises a portion that contactingly engages the housing when the reciprocating member is in the second position to serve as a limit stop to limit an insertion depth of the sealing plug into the aperture.

13. In combination, a data storage device and an apparatus for substantially hermetically sealing a housing of the data storage device, wherein the housing comprises an aperture, and wherein the apparatus comprises:

a valve body comprising a first surface which engages the housing and a sealing member associated with the first surface to create a seal between the valve body and the housing;

a chamber formed in the valve body and having a first opening at the first surface of the valve body and a second opening at a different surface of the valve body; and a reciprocating member movable between a first position and a second position to force a sealing plug into the aperture with at least a selected one of the sealing plug or the aperture being deformed to seal the aperture so that there is no additional component that assists in holding the sealing plug in place, where the first opening is in fluid communication with the second opening when the reciprocating member is in the first position and where the reciprocating member extends at least into the first opening when the reciprocating member is in the second position.

14. The combination of claim 13, wherein the cross-section of the aperture is smaller near an interior chamber than near an exterior of the housing.

15. The combination of claim 14, wherein said aperture comprises a first and second cylindrical portion.

16. The combination of claim 15, wherein the first and second cylindrical portions have different diameters.

17. The combination of claim 16, wherein the diameter of the cylindrical portion closest the interior chamber is smaller than the diameter of the cylindrical portion closest the exterior of the housing.

18. The combination of claim 13, wherein the walls of said aperture are tapered.

19. The combination of claim 13, wherein said reciprocating member further comprises a distal end portion which is adapted to extend through said first opening and into said aperture when said reciprocating member is in said second position.

20. The combination of claim 13, wherein said second opening is in communication with a low-density gas source.

21. The combination of claim 20, wherein said low-density gas source comprises helium.

22. The combination of claim 13, wherein the sealing plug is characterized as a ball.

23. The combination of claim 13, wherein the housing and the sealing plug are made of the same material.

24. An apparatus, comprising:
a housing which encloses an interior chamber for hermetically containing a gas, the housing comprising an aperture which extends from an interior to an exterior of the housing; and
a sealing plug forced into the aperture with at least a selected one of the sealing plug or the aperture being deformed to seal the aperture so that there is no additional component that assists in holding the sealing plug in place, wherein the interior includes a surface that lies along a first plane, the exterior includes a surface that lies along a second plane parallel to the first plane, and the sealing plug is wholly disposed between the first and second planes.

25. The apparatus of claim 24, wherein the sealing plug has a diameter greater than a diameter of the aperture.

26. The apparatus of claim 24, wherein the aperture comprises a first cylindrical portion having a first diameter and a second cylindrical portion having a second diameter less than the first diameter, wherein the sealing plug is sized to be larger than the second diameter, and wherein the sealing plug contacts the second cylindrical portion of the aperture.

27. The apparatus of claim 26, wherein the first cylindrical portion depends from an exterior surface of the housing and the second cylindrical portion depends from an interior surface of the housing.

28. The apparatus of claim 27, wherein the aperture further comprises a shoulder portion substantially parallel to the interior and exterior surfaces and which connects the first and second cylindrical portions.

29. The apparatus of claim 24, wherein the aperture comprises a tapered portion that tapers from a first diameter to a second diameter less than the first diameter, and wherein the sealing plug is deformed into the tapered portion.

30. The apparatus of claim 24, wherein the sealing plug is the only component forming the seal of the aperture.

31. The apparatus of claim 24, wherein the sealing plug and the housing are formed of a common material.

32. The apparatus of claim 31, wherein the common material comprises aluminum.

33. The apparatus of claim 24, further comprising a valve assembly configured to insert the sealing plug into the aperture, comprising:
a valve body comprising a first surface which engages the housing and a sealing member associated with the first surface to create a seal between the valve body and the housing;
a chamber formed in the valve body and having a first opening at the first surface of the valve body and a second opening at a different surface of the valve body; and
a reciprocating member movable between a first position and a second position, where the first opening is in fluid communication with the second opening when the reciprocating member is in the first position and where the reciprocating member extends at least into the first opening when the reciprocating member is in the second position.

34. A data storage device, comprising:
a housing which encloses an interior chamber, the housing comprising an aperture which extends from an interior to an exterior of the housing; and
a sealing plug forced into the aperture with at least a selected one of the sealing plug or the aperture being deformed to seal the aperture so that there is no additional component that assists in holding the sealing plug in place, wherein the sealing plug and the housing are made of the same material.

35. The apparatus of claim 34, wherein the sealing plug has a diameter greater than a diameter of the aperture.

36. The apparatus of claim 34, wherein the aperture comprises a first cylindrical portion having a first diameter and a second cylindrical portion having a second diameter less than the first diameter, wherein the sealing plug is sized to be larger than the second diameter, and wherein the sealing plug contacts the second cylindrical portion of the aperture.

37. The apparatus of claim 34, wherein the first cylindrical portion depends from an exterior surface of the housing and the second cylindrical portion depends from an interior surface of the housing.

* * * * *

UNITED STATES PATENT AND TRADEMARK OFFICE
CERTIFICATE OF CORRECTION

PATENT NO.       : 7,570,454 B1                                           Page 1 of 1
APPLICATION NO.  : 10/839548
DATED            : August 4, 2009
INVENTOR(S)      : Andrikowich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 617 days.

Signed and Sealed this

Seventh Day of September, 2010

David J. Kappos
*Director of the United States Patent and Trademark Office*